United States Patent [19]

Noel et al.

[11] Patent Number: 4,781,056

[45] Date of Patent: Nov. 1, 1988

[54] OPTICAL DEVICE FOR STRAIN DETECTION, METHOD FOR THE MEASUREMENT OF STRAIN BY MEANS OF THE SAID DEVICE AND THEIR APPLICATION TO SCALES

[75] Inventors: Jacques Noel, Saint-Cloud; Jean-Claude Bocquet, L'Hay Les Roses, both of France

[73] Assignee: Sopha Praxis, Paris, France

[21] Appl. No.: 934,614

[22] PCT Filed: Mar. 5, 1986

[86] PCT No.: PCT/FR86/00071

§ 371 Date: Nov. 7, 1986

§ 102(e) Date: Nov. 7, 1986

[87] PCT Pub. No.: WO86/05273

PCT Pub. Date: Sep. 12, 1986

[30] Foreign Application Priority Data

Mar. 7, 1985 [FR] France ............................. 85 03356

[51] Int. Cl.[4] ....................... G01L 1/24; G01L 25/00; G01G 3/12; G01G 9/00

[52] U.S. Cl. ..................................... 73/1 B; 73/774; 73/800; 250/231 P; 250/227; 356/32; 364/508; 177/DIG. 6

[58] Field of Search ................. 73/774, 800, 1 B, 819, 73/818; 250/227, 231 P, 231 R; 350/96.15; 356/32; 364/508; 177/211, DIG. 6

[56] References Cited

U.S. PATENT DOCUMENTS

| 4,163,397 | 8/1979 | Harmer | 73/800 |
| 4,270,050 | 5/1981 | Brogordh | 73/800 X |
| 4,295,738 | 10/1981 | Meltz et al. | 73/800 X |
| 4,321,831 | 3/1982 | Tomlinson et al. | 73/800 X |
| 4,477,725 | 10/1984 | Asawa et al. | 73/800 X |
| 4,560,016 | 12/1985 | Ibanez et al. | 73/800 X |
| 4,603,252 | 7/1986 | Malek et al. | 73/800 X |

FOREIGN PATENT DOCUMENTS 82820 6/1983 European Pat. Off. .

OTHER PUBLICATIONS

*Patents Abstracts of Japan;* vol. 1, No. 142, p. 205 (1282), Jun. 22, 1983.

*Primary Examiner*—Tom Noland
*Attorney, Agent, or Firm*—Blakely, Sokoloff, Taylor & Zafman

[57] ABSTRACT

An optical device and method for strain detection. The device is provided with at least one optical fiber arranged so as to form a network. A light emitting device is arranged at one end of the fiber and a receiver is arranged at the other end, enabling the generation of information relative to the light intensity transmitted by the fiber or fibers in the presence of strain, and a measurement corresponding to the strain.

13 Claims, 4 Drawing Sheets

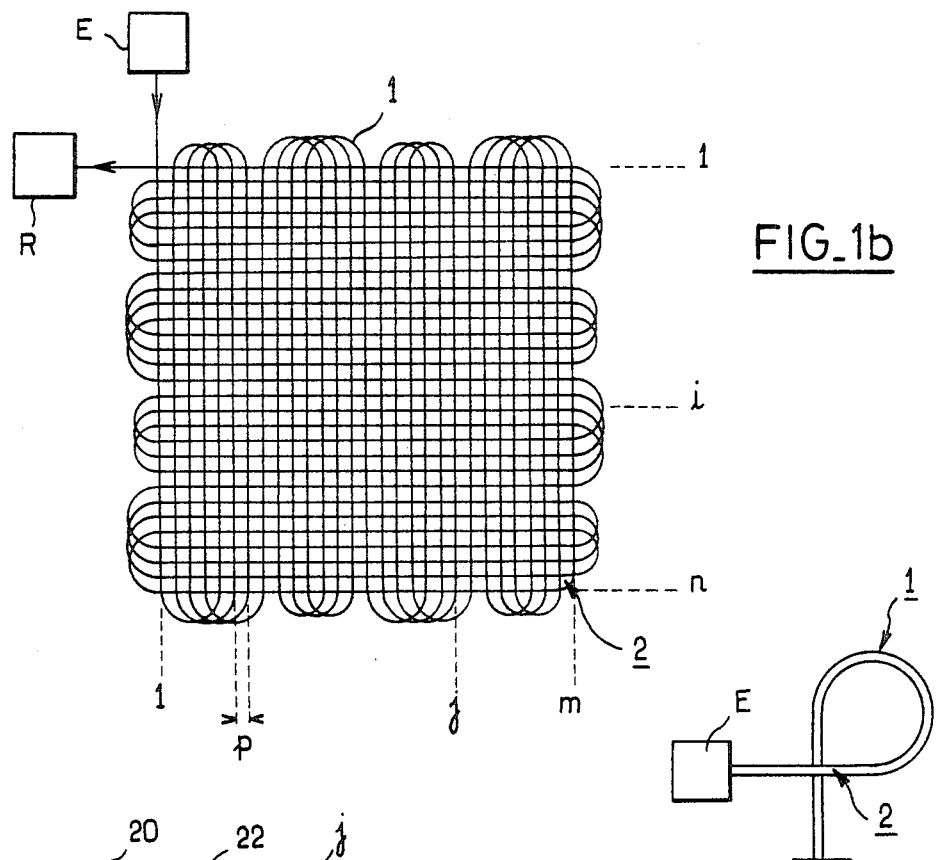
FIG_1b
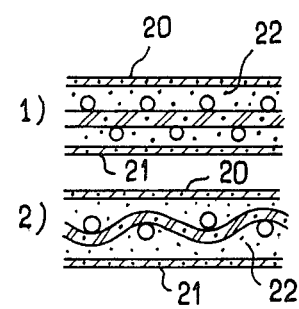
FIG_1a
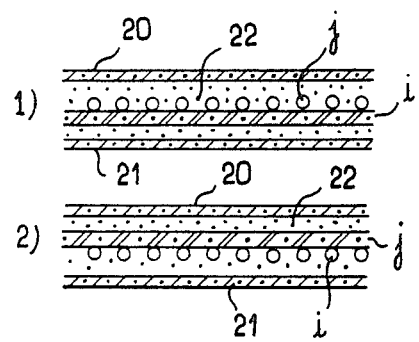
FIG_2a
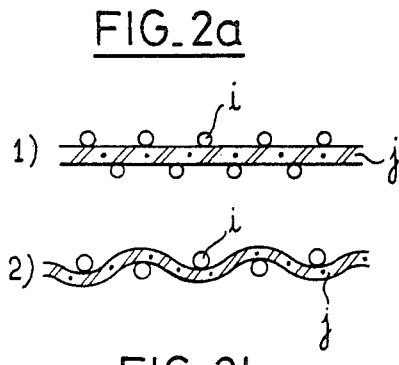
FIG_2b
FIG_2c

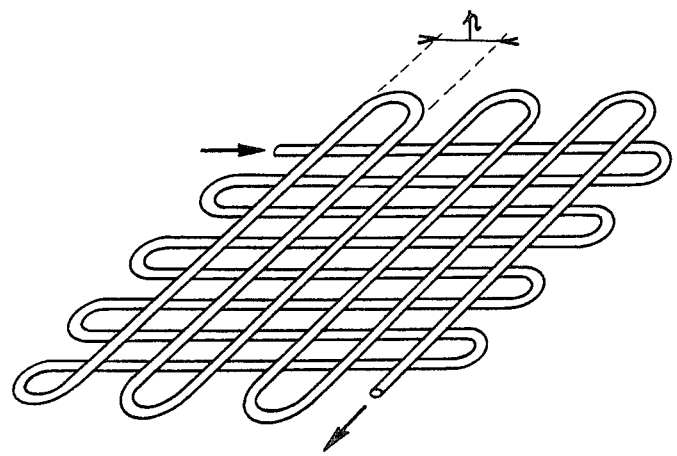
FIG_3a
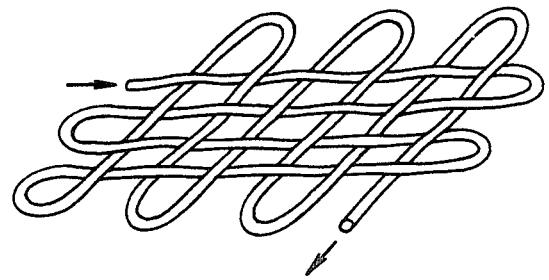
FIG_3b

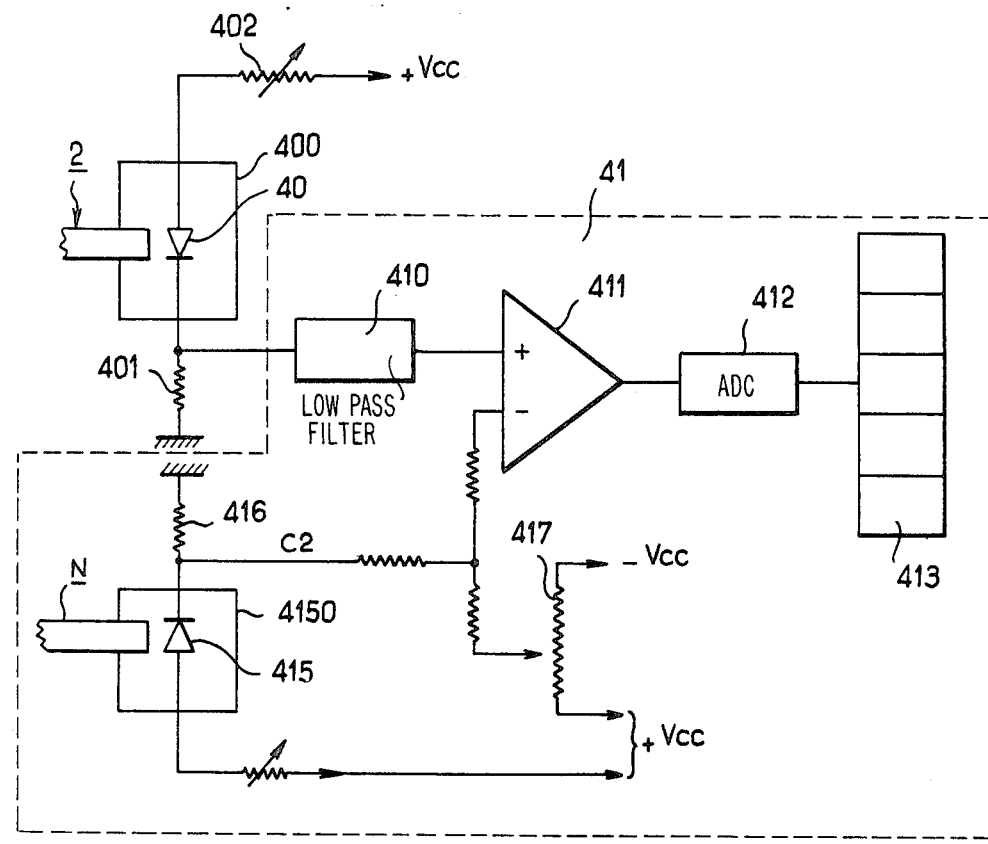
FIG_4
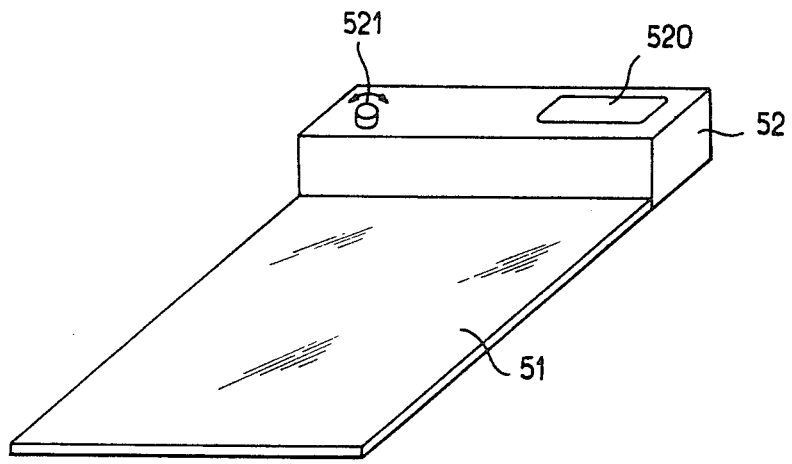
FIG_5

OPTICAL DEVICE FOR STRAIN DETECTION, METHOD FOR THE MEASUREMENT OF STRAIN BY MEANS OF THE SAID DEVICE AND THEIR APPLICATION TO SCALES

BACKGROUND OF THE INVENTION

1. Field of the Invention

The present invention relates to an optical device for strain detection, to a method for the measurement of strain by means of this device, and to their application to scales.

2. Description of Related Art

At the present time, optical devices for strain detection utilizing the deformation of a light guide of the optical fiber type permit the performance of a measurement of the strain applied to a fiber by attenuation of the luminous intensity transmitted on account of the modification of the conditions of propagation of the light in the fiber due to this deformation. Devices of the strain gauge type utilizing the abovementioned property of an optical fiber have been described, in particular, in U.S. Pat. No. 4,163,397 or in European patent application No. 0,082,820. The devices such as those described in the abovementioned documents require the implementation of an additional mechanical structure mounted, for example, at the periphery of the fiber, in order to permit the application of strains and of deformations of a periodic nature over the length of the fiber, the measurement of the total strain applied to the fiber being directly related to the attenuation of the intensity of the light transmitted by the fiber subjected to deformation. Even though this type of device effectively permits a measurement of the load or strain exerted on the fiber, it does not however sanction the simple utilization of a device capable of effecting a weight measurement under the required customary operating conditions of precision, of reliability and of accuracy required for this type of measurement apparatus, or even of a device capable of permitting a two-dimensional reading of the strains or loads exerted on a surface, i.e. a reading of a pressure map.

SUMMARY OF THE INVENTION

The object of the present invention is to utilize an optical device for strain detection which is capable of permitting the measurement of a load or of a mass under the customary conditions required for the weighing operation.

Another object of the present invention is the utilization of an optical device permitting the effecting of a reading of a pressure map over a specified test area or surface.

Another object of the present invention is the utilization of a method for measurement of load or for the recording of a pressure map over a specified test area or surface by means of the device of the invention.

The optical device for strain detection according to the invention comprises at least one optical fiber disposed in such a manner as to form a network. Means for emitting light which are disposed at one end, referred to as the entrance end, of the fiber or fibers and means for receiving light which are disposed at the other end, referred to as the exit end, of the fiber or fibers permit the supply of information relating to the luminous intensity transmitted by the fiber or fibers of the network and a corresponding measurement of the strain.

The process for determining the strains applied at a plurality of points of a test area by means of the device of the invention consists in disposing the network constituted by a plurality of fibers of the device of the invention on the test area. A zero condition of the system for each point i, j of intersection of the fibers is recorded in a memory in the absence of any test load applied to the test area and the network. The test load being applied to the network and the test area, the values of relative strain Fi, Rj which are supplied by the detector associated with each optical fiber of order i, j in a first and a second direction are memorized. The relative strain Pij applied at each point, having coordinates i, j, of intersection of the fibers of order i and of order j of the first and of the second direction of the network is determined by means of a linear combination of the type $$Pij = \frac{\alpha i Rj + \beta j Fi}{2}$$

where, m and n being the number of fibers, $$\alpha i = \frac{Fi}{\sum_{l}^{m} Rj} \text{ and } \beta j = \frac{Rj}{\sum_{l}^{n} Fi}$$

The invention is employed in weighing apparatuses, apparatuses for the measurement of loads applied to skew surfaces, in the industry concerned with the production of hollow bodies, reservoirs, shells, components formed by drawing, the testing of hollow bodies subjected over their internal walls to periodic or substantially periodic strains, and especially mechanical systems used in robotics or even the industry concerned with specialist footwear.

Application may also be found in any system in which any strain causing a displacement of an element positioned according to a system of coordinates in a plane must be detected, this detection giving a measurement of the said position.

BRIEF DESCRIPTION OF THE DRAWINGS

The invention will be better understood on reading the description and on observing the drawings which follow, in which:

FIGS. 1a and 1b show a device according to the invention, according to a simple embodiment and according to a more elaborate embodiment respectively, FIGS. 2a, 2b and 2c show a detail of construction of the devices forming the subject of the invention, in accordance with a section of FIG. 1b, FIGS. 3a and 3b show a detailed perspective view of an element of FIG. 1b, FIG. 4 shows a detailed scheme of construction of an element of FIGS. 1a or 1b, FIG. 5 shows a device of the invention, which device is more particularly adapted to weighing, FIG. 6b shows a detailed scheme illustrating a process for the measurement of pressure by means of a device of the invention as represented in FIG. 6a.

Figure 6A:
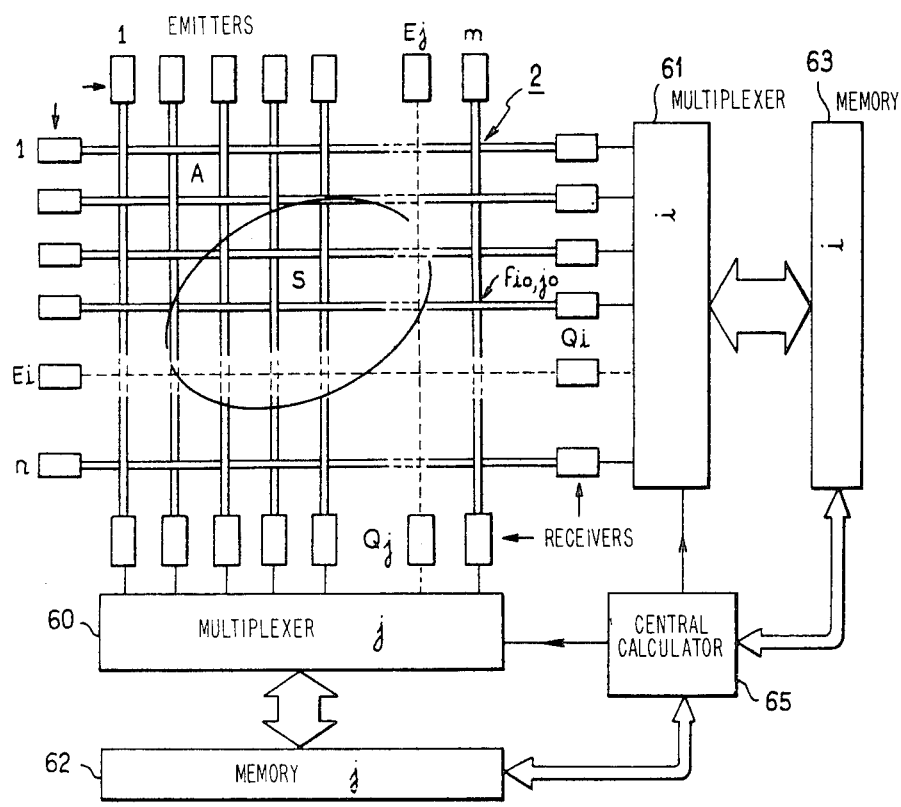
FIG. 6a shows a device of the invention, which device is more particularly adapted for the formulation of a statement or map of pressures exerted on a test area or surface.

In the set of abovementioned figures, the details and relative dimensions of the various elements have not been respected, in order to avoid prejudicing the clarity of their representation.

DESCRIPTION OF THE PREFERRED EMBODIMENTS

A description of the principle of the optical device for strain detection according to the invention will be given, first of all, with reference to FIGS. 1a and 1b. The device of the invention comprises at least one optical fiber 1 disposed in such a manner as to form a network 2. Means for emitting light which are given the reference E are disposed at one end of the optical fiber or fibers, and means for receiving light which are given the reference R are disposed at the other end of the fiber, which is referred to as the exit end of the fiber or fibers. The receiving means R are capable of supplying information relating to the luminous intensity transmitted by the fiber or fibers of the network and a corresponding measurement of the applied strain.

The term "network" should be understood as referring, for example, to a simple loop constituted by an element of fiber which is folded and which exhibits a point of intersection, forming a contact, of the folded elements or any combination of one or more fibers and of filaments forming mechanical contact with the fibers disposed in such a manner as to form an arrangement constituting a meshed network, which may or may not be regular, as shown in FIG. 1b. In FIG. 1b, the meshed network 2 forming the subject of the invention has been shown in a non-limiting particular embodiment, each mesh of the network being delimited by two weft lines i and two warp lines j which are successive respectively, the warp and weft lines being constituted by the fiber or fibers spaced according to a determined pitch p. The network 2 comprises m, n lines.

The spacing pitch p of the warp and/or of the weft lines is taken to be equal to $k \times \lambda/2$, where $\lambda$ represents the critical spatial period of the mechanical perturbation capable of coupling the groups of adjacent propagation modes in the fiber under consideration and k represents an integer $>1$. For a given network, the value k may be taken to be variable within determined limits of value. For a given fiber, the value of the parameter is given by the Fields formula or equation: $\lambda = 2\pi a/(2\Delta)^{\frac{1}{2}}$, for an optical fiber exhibiting a refractive index gradient, this being an equation in which a is the radius of the core of the fiber, $2\Delta = (1 - {}^2_o/n^2_o)$, $n_o$ being the refractive index of the sheath of the optical fiber and $n_c$ the refractive index of the core of the fiber respectively.

According to the embodiment shown in FIG. 1b, the fiber network 2 is constituted by a single fiber folded in successive offset windings, a group of windings being formed according to an individual sense of rotation, for example the trigonometrical sense of rotation, and then a second successive group of windings being subsequently formed according to an individual sense of rotation, opposed to the first, and so on. The number of groups having been selected according to a first direction, the fiber is then bent in a second direction, for example perpendicular to the first direction, in order to form a second arrangement of groups of windings extending in this second direction. The ends of the fiber which is thus constituted in the form of a network may then be connected to the emitter E and to the receiver R for light.

A luminous signal being emitted by the emitter E, the propagation of this in the fiber constituted in the form of a network is modified by any field of loads which are applied to the network, in accordance with the corresponding theory of the interaction between the deformations applied to the fiber and the attenuation of the transmitted intensity of the luminous signal under the effect of these deformations. For a theoretical study of these interactions, reference may be made to the study published by A. J. Barlow, J. J. Ramskov Hansen and D. N. Payne, entitled "Birefringence and polarisation mode-dispersion in spun single-mode fibres" (Vol. 20, page 2962, September 1981).

Various embodiments of the network 2 will now be described with reference to FIGS. 2a, 2b, 2c and 3a, 3b.

As shown in FIG. 2a.1, FIG. 2a.2 and FIG. 3a, the optical fiber or fibers are disposed in such a manner as to form a network constituted by weft lines and warp lines, the weft lines i being superposed on the warp lines j or vice versa. In FIGS. 2a.1 and 2a.2, the respective views are represented in section according to the weft line of order i and the warp line of order j respectively. In order to assure the mechanical stability of the whole network 2, the latter may be embedded in a layer of silicone elastomeric material. The elastomeric material may, for example, be constituted by a material which is commercially available and which is known under the trade mark "Rhodorsil" and which is distributed by the company Rhone-Poulenc. This material permits to some extent the construction of a network element in the form of a mat, on the faces of which an upper plate 20 and a lower plate 21 may be disposed and fixed by cementing in order to assure the protection thereof. The upper plate 20 and the lower plate 21 may, for example, be constituted by a neoprene material, or a synthetic or natural fiber.

According to another embodiment, the material 22 embedding the network 2 of optical fibers may be constituted by an alveolate material of the polyurethane foam type. In the latter case, the density of the alveolate material and consequently its elasticity are chosen in such a manner as to establish a range of sensitivity of the network provided with its casing of alveolate material, the density of this material and thus its elasticity determining, in fact, the attenuation of the strains or loads applied to the network. In the two abovementioned cases, where the casing material is material of a massive type, such as in the case of polyurethane foam, the embedding of the network may be effected by molding from a casting.

According to a preferred embodiment, the network 2 may be constituted by fibers and/or filaments which are knitted or woven. Examples of the construction of a knitted or woven network are shown in FIGS. 2b.1, 2b.2, 2c.1, 2c.2 and in FIG. 3b. As is shown in FIG. 2b.1, each weft line i is superposed on each warp line j and vice versa at each mesh or pitch of the network. This superposition may be effected either according to a single direction of the network, as shown in FIGS. 2b.1, 2c.1 or indeed according to both directions of the network, as shown in FIGS. 2b.2, 2c.2 and 3b of the drawings. Moreover, FIGS. 2c.1 and 2c.2 show a network provided with its embedding layer 22 and with its upper plate 20 and lower plate 21. The optical fibers of the warp or of the weft may be replaced by a filamentary element, the only function of which is to permit the application of the strain to the weft or warp lines, which are themselves constituted by optical fibers, the network being then formed in this manner.

The optical fibers utilized for the construction of the networks as described above may be either monomode fibers or multimode fibers exhibiting an index gradient or an index jump and, for example, plastic fibers having a diameter in the range between 25 tenths of a millimeter and one millimeter, or silica quartz fibers having a diameter of one tenth of a millimeter. When use is made of plastic fibers having a diameter of 25 tenths of a millimeter in order to constitute the network, it is possible to obtain a final structure as shown in FIG. 2a or 2c, the thickness of which does not exceed 7 to 8 millimeters.

An embodiment of the emitters E and receivers R will now be given with the description of FIG. 4. The means for emitting light E may comprise one or more light-emitting diodes. The means for receiving light themselves comprise one or more photoconducting diodes, photodiodes 40, equipped with a detecting device 41. It is self-evident that the nature of the diodes used for the emission of the light determines, as a function of the optical characteristics of the fiber or fibers used, the geometrical parameters of the network. Thus, for one or more light-emitting diodes emitting in the region of the near infrared, the critical period $\lambda$ is 9.81 millimeters for a plastic fiber having a diameter of 1 millimeter.

As shown in FIG. 4, the light-emitting diode or light-emitting diodes and the photodiode or photodiodes 40 are enclosed in a housing 400, which is light-proof, and in which the end of the fiber, being the exit end of the network 2, is enclosed, in such a manner as to assure an appropriate illumination of the photodiode 40.

The detecting device 41 comprises, connected in cascade, a low pass filter 410 and an analog-digital converter 412, as well as a display device 413. The low pass filter 410 is connected to the load resistance 401 of the diode 40, which is moreover fed with a polarization voltage +Vcc via an adjustable resistor 402. The display device 413 may, for example, be constituted by a seven-segment display device or by a liquid crystal display system.

In order to assure very good accuracy of measurement, the detecting device 41 further includes a calibration or zero-setting device. The latter includes a differential amplifier 411 inserted between the low pass filter 410 and the analog-digital converter 412 and the positive input of which is connected to the output of the low pass filter 410. The negative input of the differential amplifier is connected to a potentiometer 417 for setting the zero, which is itself connected to two voltages of opposite sign +Vcc, -VCC. Moreover, a neutral fiber is provided, which bears the reference N in Figure 4, in order to assure calibration or regulation of the zero of the apparatus as a function of the optical condition of the system. The expression "neutral fiber" is understood to refer to a fiber of the same nature and originating from the same production batch as the fiber or the fibers used for the construction of the network but not subjected to the load strains. The neutral fiber N receives by way of entrance illumination a fraction of the illumination generated by the light-emitting diode or the light-emitting diodes of the network by means, for example, of a simple optical system which is not shown in the drawings, in order to avoid making the latter excessively complicated. The neutral fiber N supplies, from a specifically associated light receiver 415, which is likewise enclosed in a light-proof housing 4150, a signal for regulation of the zero Cz to the negative input of the differential amplifier. The neutral fiber system permits, in particular, either protection against the inevitable aging of the components constituting the optical fibers or the authorization of the supplying of all the electronic circuits from an independent source of direct voltage, in spite of the reductions in the voltage level of said circuits inherent in their aging, with a degree of accuracy of measurement which is sufficient with the passage of time.

An example of application of the device of the invention will now be described within the context of a weighing device as shown in FIG. 5. The device shown in this figure is particularly well adapted as a device for weighing persons. It includes, in particular, a network constituted in the form of a mat 51, as described above, and a housing 52 including an emitter and a receiver for light and the associated detection circuit as described above. The display device 413 of FIG. 4 appears on the upper face of the housing 52 at the location of a window 520. A button for setting the zero 521, which likewise appears on the upper face of the housing, permits the user to set the zero by controlling the potentiometer 417. The type of apparatus described in FIG. 5 appears to be particularly well adapted for domestic use, the mat 51 forming a network, the overall thickness of which does not exceed 7 millimeters, being capable, for example, of being inserted under the mat or the floor carpet of a living room.

Another device which is in accordance with the invention and which is especially adapted to permit recording of the relative strains or a map of the pressures applied at a plurality of points of a test area will now be described with reference to FIG. 6a. According to this figure, the device comprises a network 2 which is constituted by a plurality of m warp lines in a first direction and of n weft lines in a second direction. For convenience in FIG. 6a, the first direction and the second direction have been shown perpendicular. Each warp line or weft line is constituted by an independent optical fiber provided with its means for emitting light which bear the references $E_i$, $E_j$ and with its receiving means and detecting means which bear the references $Q_i$, $Q_j$. Dynamic memorization means 62, 63 permit memorization of the pertinent strain values $F_i$, $R_j$ supplied by the detector associated with each optical fiber of order i, j in the first and second direction respectively. Moreover read/write means, memorization means 62, 63 mentioned above and calculating means 65 permit calculation of the relative strain applied at each point of the network of coordinates i, j of the first and second direction respectively of the network, according to a linear combination of the measurements supplied by the receivers $Q_i$, $Q_j$ of the form $$Pij = \frac{\alpha i Rj + \beta j Fi}{2}$$

where:

$$\alpha i = \frac{Fi}{\sum\limits_{1}^{m} Rj}$$

and where $$\beta j = \frac{Rj}{\sum\limits_{1}^{n} Fi}$$

m and n being the number of warp lines and of weft lines respectively.

In FIG. 6a, the read/write means, memorization means 62, 63 and the means for calculating the relative strain applied to the network may, for example, be constituted by a central calculator 65. In addition, in order to assure the linking of the receivers $Q_i$, $Q_j$ to the corresponding memories 63, 62, multiplexer systems i bearing the reference 61 and multiplexer systems j bearing the reference 60 are likewise provided. These multiplexers, driven by the central calculator 65, permit the sequential connection of all the receivers $Q_i$, $Q_j$ and the recording in the corresponding memories, memories i, 63, memories j, 62, at determined addresses, of the values of attenuation or consequently of strain which are given by the abovementioned detectors. The central calculator 65 may be provided with a keyboard of the computer keyboard type, with a television monitor permitting the display, at the will of the operator, of the measurement results, with auxiliary memories permitting the storage in the central memory of the calculator, of any program for processing the data measured by the receivers $Q_i$, $Q_j$. The abovementioned receivers may be reduced, in each case, to a photodiode, a low pass filter and an analog-digital converter as described above within the context of Figure 4. The multiplexers 60 and 61 may be multiplexers or digital switching circuits which are normally available commercially. The memories 62, 63 may normally be memories of the RAM memory type, addressable memories, which can be read from, written to and deleted at will. They may or may not be integrated with the central calculator 65.

A method for recording the strains applied at a plurality of points of a test area by means of a device as described, in particular, in FIG. 6a, will be described in conjunction with this figure as well as with FIG. 6b. The method consists in disposing the network 2 of the device of the invention on the test area. In the absence of a test load applied to the test area and thus to the network 2, a zero condition of the system is recorded in the memory for each point of coordinates i, j, of intersection of the optical fibers of the network of corresponding order. It will, in fact, be understood that the network 2 of the device as described is particularly adapted for application for load measurement on a skew surface, by reason on the one hand of the small thickness dimensions of the network, it naturally being possible for the latter, for the purposes of the application under consideration, to be constituted by means of optical fibres of silica quartz having a diameter of the order of one tenth of a millimeter, the total thickness after embedding of the network of fibers being less than two millimeters. In FIG. 6a, the emitters $E_i$, $E_j$ and the receivers $Q_i$, $Q_j$ have been shown in immediate proximity to the network 2 for practical reasons associated with the production of the drawing. It is indeed evident that the emitters and receivers may, on the other hand, be disposed far from this network, in order to provide the latter with full maneuverability properties and facility of manipulation for the applications on the most widely varying skew surfaces. In particular, the network 2 thus appears as a sensitive skin capable of detecting any pressure or load information and its location.

The test load is then applied to the area and the network 2, and the values of relative strain $F_i$, $R_j$ supplied by each detector or receiver in the first and second direction respectively are memorized. The relative strain $P_{ij}$ applied at each point of coordinates i, j of intersection of the fibers of order i and of order j of the first and second direction respectively of the network is then determined by calculation in accordance with the equation:

$$P_{ij} = \frac{\alpha_i R_j + \beta_j F_i}{2}$$

where $$\alpha_i = \frac{F_i}{\sum\limits_{1}^{m} R_j} \text{ and } \beta_j = \frac{R_j}{\sum\limits_{1}^{n} F_i}$$

As the calculation of the relative strain $P_{ij}$ only involves ordinary arithmetic operations, this calculation is advantageously carried out by means of a program stored in the central calculator. Moreover, although not necessarily but in an advantageous manner, the values of relative strain $F_i$, $R_j$ may be standardized in relation to the greatest relative strain value supplied by the detectors prior to the phase consisting in determining the relative strain $P_{ij}$. The expression "standardized value of strain" is understood to refer to a value of strain expressed in magnitude reduced in proportion to the greatest one of the strain values, which is consequently taken in an arbitrary manner to be equal to 1, the other values being expressed in proportion to the latter.

Figure 6B:
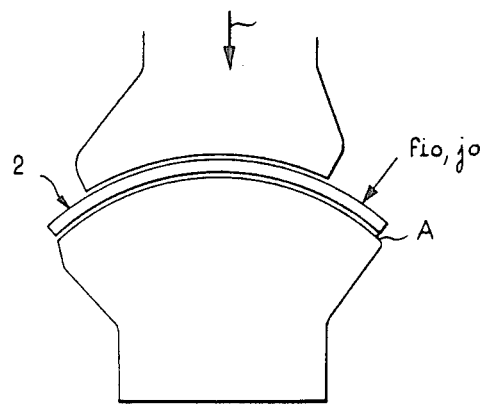

The method as described above will now be explicitly described in the case of the determination of the absolute strain $e_{i,j}$ applied at each point of coordinates i, j of intersection of the optical fibers of order i, j of the network with reference to FIGS. 6a and 6b. To this end, the process consists in disposing the network 2 of the apparatus on a support area A greater than the test area S to which the loads are applied. In FIGS. 6a and 6b the support area and the test area have been shown, the test area S being shown at the location of the interfitting of two complementary surfaces of a tool, for example. The test area S is thus defined for any point of the network 2 of coordinates u, v such that $1 < u < n; 1 < v < m$. In the absence of a test load on the network 2, a zero condition defining the initial condition of the system is recorded in the abovementioned memories i, j, 62, 63. The test load being applied to the network at the location only of the test area S, the values of relative strain $F_i$, $R_j$ which are supplied by each detector associated with each optical fiber of order i, j are then memorized in the memories i, j, 62, 63 in relation to the first and second directions of the network. While the test load is maintained, a standard strain $f_{i_o, j_o}$ of known determined value is applied at a point or at least one point of coordinates $i_o$, $j_o$ of the network which are such that $i_o \notin u$ and $j_o \in v$ or conversely $i_o \in u$ and $j_o \notin v$, that is to say at a point of the network 2 exterior to the test area S. The new values of relative strain $F_{i_o}$, $R_{j_o}$ supplied by the detector associated with each optical fiber of order $i_o$ or $j_o$ respectively in the first or second direction respectively are then placed in memory at addresses different from the previous addresses used to memorize the values of strain in the absence of standard load. The various values of absolute strain $e_{i,j}$ of the assembly of the network and of the test area S are then obtained from the new values of relative strain $F_{i_o}$, $R_{j_o}$ in the presence of a standard load, the value of the standard strain $f_{i_o, j_o}$ and the previously memorized values of relative strain $F_i$, $R_j$ by linear combination of these values.

It is evident that the standard strain load must be applied at a point whose coordinates correspond to the order of one of the fibers which is subjected to the test load, that is to say traversing the test area, as represented in FIG. 6a. However, in order to obtain a simplification of the calculations and thus of the programs permitting their implementation, it may appear to be advantageous to exert the standard load at a point corresponding to the fiber on which the value of strain measured by the detector is a maximum. The determination of the order, that is to say of the order number of the corresponding fiber may be effected by a program capable of selecting the greatest one of the strain values Fi or Rj memorized in the memories 62, 63. These conventional programs in the processing of data will not be described, since they rely only on the normal knowledge of a person skilled in the art of data processing. A description has thus been given of a modified embodiment of a device and of a method of the invention permitting all the applications previously indicated in the present description. With regard to the application of a device as shown in FIG. 6a for the location of the movement of an element positioned at XY in a reference plane, the abovementioned device can be used, for example, as a sensitive element of a keyboard of the computer keyboard type, on which the corresponding position of the keys permits the corresponding addressing at XY of the latter and consequently a code of symbols or alphanumeric characters according to the codes currently used in the area of the transmission or of the processing of information.

The device and the method forming the subject of the invention are not limited only to the described embodiment; in particular, corresponding devices utilizing a sensitive skin as described above may advantageously be used in the area of robotics for the construction of gripping elements in particular.

We claim:

1. An optical device for strain detection, which device comprises:
    at least one optical fiber (1) disposed in such a manner as to form a network (2), said at least one fiber being disposed in such a manner as to form a regular meshed network, each mesh of the network being delimited by two weft lines (i) and two warp lines (j) which are successive and which are respectively constituted by said at least one fiber spaced according to a specified pitch, the spacing pitch of the warp and weft lines being equal to k λ/2 where k is an integer equal to or greater than 1 and where λ represents the critical period of the mechanical perturbation capable of coupling the groups of adjacent propagation modes, $\lambda = 2\pi a/(2\Delta)^{\frac{1}{2}}$ where: a is the radius of the core of the fiber, $2\Delta = (1 - n_o^2/n_c^2)$, $n_o$ being the refractive index of the sheath of the optical fiber and $n_c$ the refractive index of the core of the fiber respectively,
    means for emitting light (E) which are disposed at one end, referred to as the entrance end of said at least one fiber and means for receiving light (R) which are disposed at the other end, referred to as the exit end, of said at a least one fiber, said receiving means (R) being capable of supplying information relating to the luminous intensity transmitted by said at least one fiber of the network and a corresponding measurement of the strain.

2. The device as claimed in claim 1, wherein the said optical fiber or optical fibers are disposed in such a manner as to form a network constituted by weft lines and by warp lines, the warp lines (j) being superposed on the weft lines (i) or vice versa.

3. The device as claimed in claim 1, wherein the said fiber or fibers are knitted.

4. The device as claimed in claim 1, wherein said fiber or fibers are woven.

5. The device as claimed in claims 2, 3 or 4, wherein each weft line (i) is superposed on each warp line (j) and vice versa at each mesh or pitch of the network.

6. The device as claimed in claim 1, wherein the means for emitting light comprise one or more light-emitting diodes, the said means for receiving light comprising one or more photodiodes (40) equipped with a detecting device (41).

7. The device as claimed in claim 6, wherein the detecting device (41) comprises, connected in cascade, a low pass filter (410), an analog-digital converter (412) and a display device (413).

8. The device as claimed in claim 7 wherein the said detecting device (41) further includes a calibration or zero-setting device, comprising:
    a differential amplifier (411) inserted between the low pass filter (410) and the analog-digital converter (412) and the positive input of which is connected to the output of the low pass filter (410), the negative input of the said differential amplifier being connected to a potentiometer (417) for setting the zero,
    a neutral fiber (N) receiving by way of entrance illumination a fraction of the illumination generated by the light-emitting diode or the light-emitting diodes of the network and supplying from a specifically associated light receiver (415) a signal for regulation of the zero (CZ) to the negative input of the differential amplifier.

9. A weighing apparatus comprising an optical device for strain detection as claimed in claims 1, 2, 3, 4, 6, 7, or 8, which apparatus comprises a network of optical fibers which is constituted in the form of a mat (51) and a housing (52) equipped with a display window (520) and with a calibration button (521).

10. The device as claimed in claims 1, 2, 3, 4, or 6, wherein, for the purpose of effecting a statement of the relative strains applied at a plurality of points of a test area, the said device comprises:
    a network comprising a plurality of m warp lines in a first direction and n weft lines in a second direction, each warp line or weft line being constituted by an independent optical fiber provided with means for emitting light and receiving means and detectors,
    means for dynamic memorization of the values of relative strain Fi, Rj which are supplied by the detector associated with each optical fiber of order i, j, in the first and second direction respectively,
    read/write means, memorization means and means for calculating the relative strain applied at each point of the network of coordinates i, j of the first and second direction respectively of the network according to the equation:

$$P_{ij} = \frac{\alpha_i R_j + \beta_j F_i}{2}$$

where $$\alpha i = \frac{Fi}{\sum_{l}^{m} Rj}$$

and where $$\beta j = \frac{Rj}{\sum_{l}^{n} Fi}$$

11. A method for stating the strains applied at a plurality of points of a test area comprising:
  (a) disposing a network (2) of at least one optical fiber contained in an optical device for strain detection on the test area,
  (b) recording in memory for each point of coordinates i, j a zero condition in the absence of a test load applied to the test area and the network (2),
  (c) applying the test load to the area and the network and memorizing the values of relative strain Fi and Rj supplied by and a detector associated with each optical fiber of order i j in the first and second directions respectively,
  (d) determining the relative strain Pij applied at each point of coordinates i, j of intersection of the fibers of order i and of order j of the first and second direction respectively of the network in accordance with the equation:

$$Pij = \frac{\alpha i Rj + \beta j Fi}{2}$$

where $$\alpha i = \frac{Fi}{\sum_{l}^{m} Rj}$$

and where $$\beta j = \frac{Rj}{\sum_{l}^{n} Fi}$$

m is the total number of lines in the first direction, and n is the total number of lines in the second direction.

12. The method as claimed in claim 11, wherein, prior to the phase consisting of determining the relative strain applied at each point of coordinates i, j of the network, the values of relative strain Fi, Rj are standardized in relation to the greatest value of relative strain which is supplied by the detector or detectors.

13. The method as claimed in one of the preceding claims 11 or 12, wherein, for the purpose of determining the absolute strain ei, j applied at each point of coordinates i, j of intersection of the optical fibers of order i, j of the network, the said method comprises the steps of:
  (a) disposing the said network of the apparatus on a support area greater than the test area to which the loads are applied, the said test area being thus defined for any point of the network of coordinates u, v such that $1 < u < n$; $1 < v < m$,
  (b) recording in memory for each point i, j of the network, in the absence of a test load, a zero condition defining the initial condition of the system,
  (c) applying the test load to the network, at the location of the test area, and memorizing the values of relative strain Fi, Rj which are supplied by the detector associated with each optical fiber of order i, j in the first and second direction respectively,
  (d) while the test load is maintained, applying at least one point of coordinates $i_o$, $j_o$ of the network which are such that $i_o \not\subset u$ and $j_o \angle v$ or $i_o \in u$ and $j_o \notin v$, that is to say at a point of the network exterior to the test area, a determined standard strain $fi_o$, $j_o$ and memorizing the new values of relative strain $Fi_o$, $Rj_o$ which are supplied by the detector associated with each optical fiber of order $i_o$ and $j_o$ respectively in the first and second direction respectively,
  (e) determining from the new values of relative strain $Fi_o$, $Rj_o$ and from the value of the standard strain $fi_o$, $j_o$ the various values of absolute strain ei, j of the assembly of the network and of the test area by linear combination of these values.

* * * * *

UNITED STATES PATENT AND TRADEMARK OFFICE
CERTIFICATE OF CORRECTION

PATENT NO. : 4,781,056

DATED : 11/01/88

INVENTOR(S) : Noel et al.

It is certified that error appears in the above-identified patent and that said Letters Patent is hereby corrected as shown below:

Col. 03 line 47, delete "$2\Delta=(-^2o/n^2o)$" insert --$2\Delta=(1 - n_o^2 / n_o^2)$ --.

Signed and Sealed this

Twenty-sixth Day of September, 1989

Attest:

DONALD J. QUIGG

Attesting Officer

Commissioner of Patents and Trademarks